United States Patent
Hill et al.

(10) Patent No.: US 12,131,130 B2
(45) Date of Patent: *Oct. 29, 2024

(54) EXPLOITING ACTIVATION SPARSITY IN DEEP NEURAL NETWORKS

(71) Applicant: QUALCOMM Incorporated, San Diego, CA (US)

(72) Inventors: Rexford Alan Hill, San Diego, CA (US); Aaron Douglass Lamb, San Diego, CA (US); Michael Goldfarb, San Diego, CA (US); Amin Ansari, Federal Way, WA (US); Christopher Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,159

(22) Filed: Feb. 2, 2023

(65) Prior Publication Data

US 2023/0185532 A1 Jun. 15, 2023

Related U.S. Application Data

(63) Continuation of application No. 16/147,297, filed on Sep. 28, 2018, now Pat. No. 11,586,417.

(51) Int. Cl.
*G06F 7/544* (2006.01)
*G06F 5/06* (2006.01)
*G06N 3/063* (2023.01)

(52) U.S. Cl.
CPC ............. *G06F 7/5443* (2013.01); *G06F 5/06* (2013.01); *G06N 3/063* (2013.01)

(58) Field of Classification Search
CPC .............................. G06F 7/5443; G06N 3/063
See application file for complete search history.

(56) References Cited

U.S. PATENT DOCUMENTS 9,818,059 B1 11/2017 Woo et al.
9,836,691 B1 12/2017 Narayanaswami et al.
(Continued)

FOREIGN PATENT DOCUMENTS

CN 108009626 A 5/2018
TW 201734893 A 10/2017
(Continued)

OTHER PUBLICATIONS

Han S., et al., "EIE: Efficient Inference Engine on Compressed Deep Neural Network", ACM/IEEE 43rd Annual International Symposium Computer Architecture (ISCA), vol. 44, No. 3, Jun. 18, 2016, pp. 243-254.
(Continued)

*Primary Examiner* — Michael D. Yaary
(74) *Attorney, Agent, or Firm* — Seyfarth Shaw LLP

(57) ABSTRACT

A method of exploiting activation sparsity in deep neural networks is described. The method includes retrieving an activation tensor and a weight tensor where the activation tensor is a sparse activation tensor. The method also includes generating a compressed activation tensor comprising non-zero activations of the activation tensor, where the compressed activation tensor has fewer columns than the activation tensor. The method further includes processing the compressed activation tensor and the weight tensor to generate an output tensor.

17 Claims, 10 Drawing Sheets

(56) References Cited

U.S. PATENT DOCUMENTS

| | | | |
|---|---|---|---|
| 2016/0328644 A1 | 11/2016 | Lin et al. | |
| 2017/0193361 A1 | 7/2017 | Chilimbi et al. | |
| 2017/0293659 A1 | 10/2017 | Huang | |
| 2018/0046437 A1 | 2/2018 | Lo | |
| 2018/0046895 A1 | 2/2018 | Xie et al. | |
| 2018/0046901 A1 | 2/2018 | Xie et al. | |
| 2018/0046916 A1 | 2/2018 | Dally et al. | |
| 2018/0218518 A1 | 8/2018 | Yan et al. | |
| 2019/0340492 A1* | 11/2019 | Burger | G06N 3/08 |
| 2019/0340499 A1 | 11/2019 | Burger et al. | |
| 2019/0370645 A1 | 12/2019 | Lee et al. | |
| 2020/0104692 A1 | 4/2020 | Hill et al. | |

FOREIGN PATENT DOCUMENTS

| | | |
|---|---|---|
| TW | 201800987 A | 1/2018 |
| WO | 2017214728 A1 | 12/2017 |

OTHER PUBLICATIONS

Albericio J., et al., "Cnvlutin: Ineffectual-Neuron-Free Deep Neural Network Computing", 2013, 21st International Conference on Program Comprehension (ICPC), [International Symposium on Computer Architecture, (ISCA)], IEEE, US, Jun. 18, 2016, pp. 1-13, XP032950644, abstract; figures 3, 4, 5, 6(b), 7, 8 I, lines 39-43, III-B, lines 1-2, III-B, lines 6-8, III-B, lines 10-12, III-B, lines 25-28, III-C, lines 4-6.III-C, lines 12-13, III-C, lines 19-35, IV-A, IV-B, lines 7-10, IV-B1, IV-B3, VII, lines 1-5.

International Search Report and Written Opinion—PCT/US2019/053325—ISA/EPO—Jan. 23, 2020.

Merrill D., et al., "Merge-Based Parallel Sparse Matrix-Vector Multiplication", Nov. 13, 2016, 1077952576-1077952576, Nov. 13, 2016 (Nov. 13, 2016), pp. 1-12, XP058308698, ISBN: 978-1-4673-8815-3, the whole document.

Parashar A., et al., "SCNN: An Accelerator for Compressed-Sparse Convolutional Neural Networks", In Proceedings of ISCA '17, ACM/IEEE 44th Annual International Symposium on Computer Architecture (ISCA), Toronto, ON, Canada, Jun. 24-Jun. 28, 2017, pp. 27-40, Jun. 24, 2017 (Jun. 24, 2017), XP033268524, DOI: 10.1145/3079856.3080254, 14 Pages [retrieved on Dec. 12, 2017], the whole document.

Taiwan Search Report—TW108135184—TIPO—Dec. 30, 2022.

* cited by examiner

FIG. 5 —PRIOR ART—

EXPLOITING ACTIVATION SPARSITY IN DEEP NEURAL NETWORKS

CROSS-REFERENCE TO RELATED APPLICATION

The present application is a continuation of U.S. patent application Ser. No. 16/147,297, filed Sep. 28, 2018, and titled "EXPLOITING ACTIVATION SPARSITY IN DEEP NEURAL NETWORKS," the disclosure of which is expressly incorporated by reference in its entirety.

BACKGROUND

Field

Certain aspects of the present disclosure generally relate to machine learning and, more particularly, to exploiting activation sparsity in deep neural networks (DNNs).

Background

An artificial neural network, which may be composed of an interconnected group of artificial neurons (e.g., neuron models), is a computational device or represents a method performed by a computational device. These neural networks may be used for various applications and/or devices, such as internet protocol (IP) cameras, Internet of Things (IoT) devices, autonomous vehicles, and/or service robots.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep neural networks (DNNs), are layered neural network architectures. In these layered neural network architectures, the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Deep learning neural networks, having either convolution or fully connected layers, enable processing for image recognition, object detection, and natural language processing. These features enable support for autonomous driving applications as well as content-aware camera processing. Deep convolutional neural networks (DCNs) have promising applications in emerging embedded, wearable, and Internet of Things (IoT) markets.

Although these deep neural network solutions achieve excellent results, their computational complexity can be prohibitively high. Additionally, training of the models may be challenging.

SUMMARY

A method of exploiting activation sparsity in deep neural networks is described. The method includes retrieving an activation tensor and a weight tensor where the activation tensor is a sparse activation tensor. The method also includes generating a compressed activation tensor of non-zero activations of the activation tensor, where the compressed activation tensor has fewer columns than the activation tensor. The method further includes processing the compressed activation tensor and the weight tensor to generate an output tensor.

A deep neural network for exploiting activation sparsity is described. The deep neural network includes multiply-accumulate (MAC) hardware. The deep neural also includes a processor(s) coupled to the MAC hardware. The processor is configured to retrieve an activation tensor and a weight tensor where the activation tensor is a sparse activation tensor. The processor is also configured to generate a compressed activation tensor comprising non-zero activations of the activation tensor. The compressed activation tensor has fewer columns than the activation tensor. The processor is further configured to process the compressed activation tensor and the weight tensor to generate an output tensor.

A deep neural network for exploiting activation sparsity is described. The deep neural network includes means for retrieving an activation tensor and a weight tensor where the activation tensor is a sparse activation tensor. The deep neural network also includes means for generating a compressed activation tensor comprising non-zero activations of the activation tensor. The compressed activation tensor has fewer columns than the activation tensor. The deep neural network further includes means for processing the compressed activation tensor and the weight tensor to generate an output tensor.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
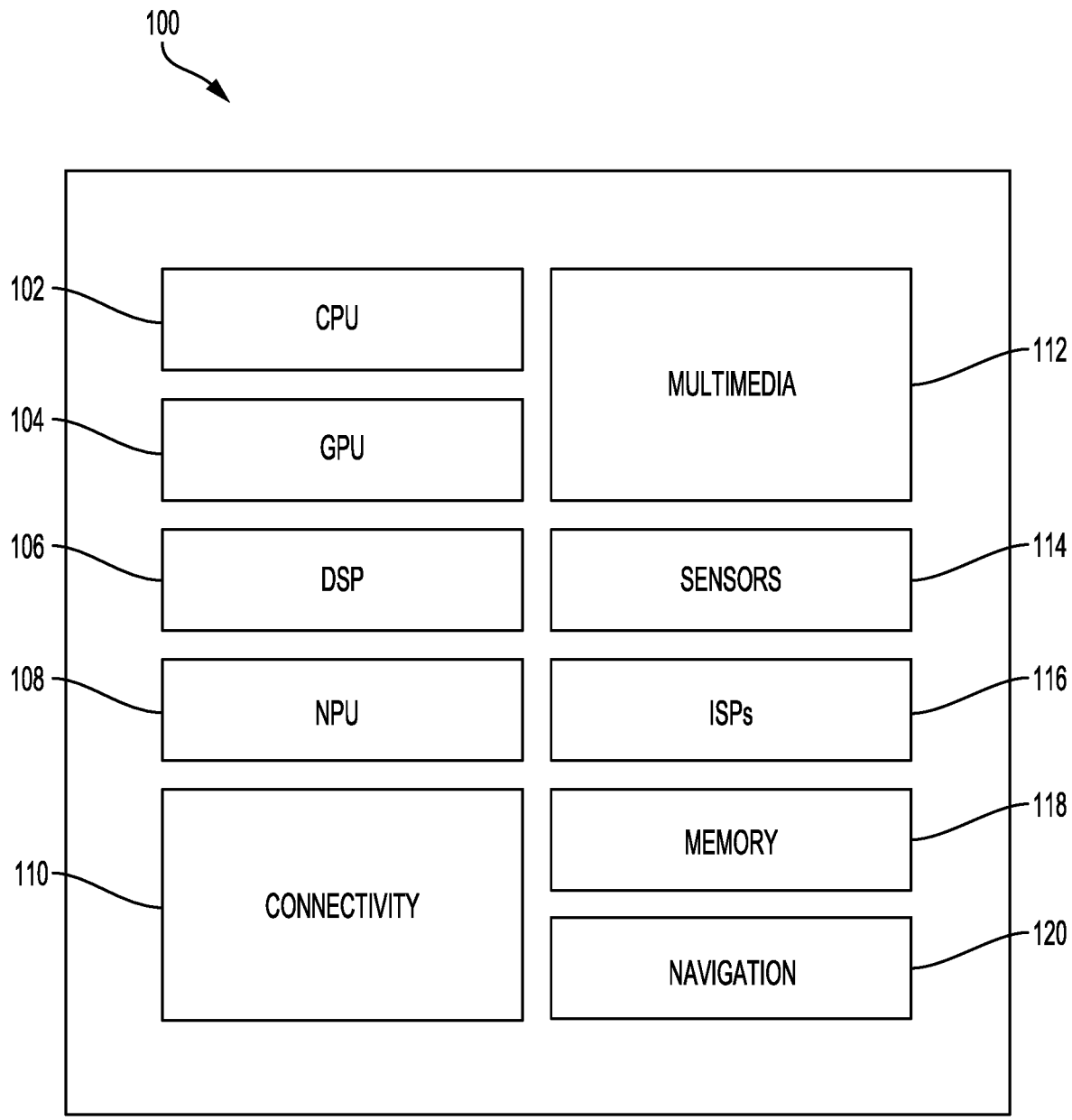
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Deep learning neural networks, having either convolutional or fully connected layers, enable processing for image recognition, object detection, and natural language processing. These features enable support for autonomous driving applications as well as content-aware camera processing. Deep convolutional neural networks (DCNs) have promising applications in emerging embedded, wearable, and Internet of Things (IoT) markets.

In operation, a deep convolutional network (or DCN) may be composed of a large number of weight tensors multiplied by activation tensors. These weight tensors and activation tensors enable multiplying of input data by weights in various filters of the DCN. For example, the activation tensors may be fed through nonlinear functions (e.g., in a previous layer of the DCN). In DCNs using rectified linear unit (ReLU) nonlinear activation functions, a significant number of activation values are zero. The zero activations are produced because ReLU nonlinear activation functions are generally configured to clamp activation values less than zero to an activation value of zero. Consequently, non-zero activation values may be sparse in DCNs using ReLU nonlinear activation functions.

DCNs are generally composed of a large number of weight tensors multiplied by activation tensors to perform a task. DCNs, therefore, consume significant computing power when handling multiply-accumulate (MAC) operations of the large number of weight tensors and activation tensors. Multiplying a weight by a zero activation, however, does not affect a resulting MAC sum. Consequently, a MAC hardware time slot is wasted when processing a zero activation at the next network layer. Depending on the amount of non-zero activation values, significant resources may be wasted on zero activations. Instead, these MAC time slots are better served for useful (non-zero) activation computations. Aspects of the present disclosure describe methods of exploiting activation sparsity in deep neural networks (DNNs).

FIG. 1 illustrates an example implementation of a system-on-a-chip (SOC) 100, which may include a central processing unit (CPU) 102 or multi-core CPUs configured to exploit activation sparsity in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a connectivity block 130, which may include fifth generation (5G) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the NPU 108 may include code to exploit activation sparsity in deep neural networks (DNNs).

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
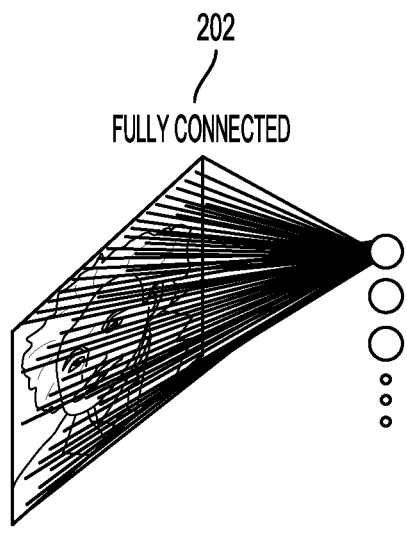
FIGS. 2A, 2B, and 2C are diagrams illustrating a neural network in accordance with aspects of the present disclosure.
Figure 2B:
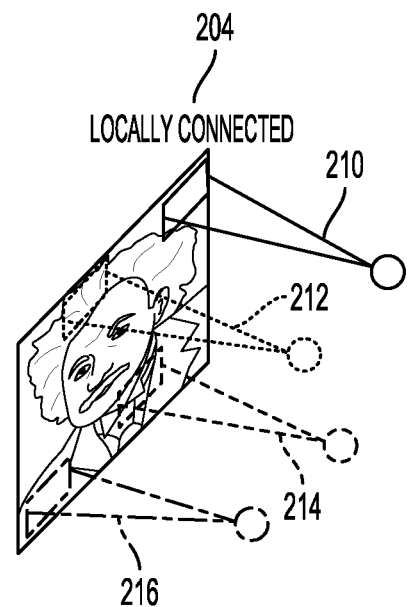

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
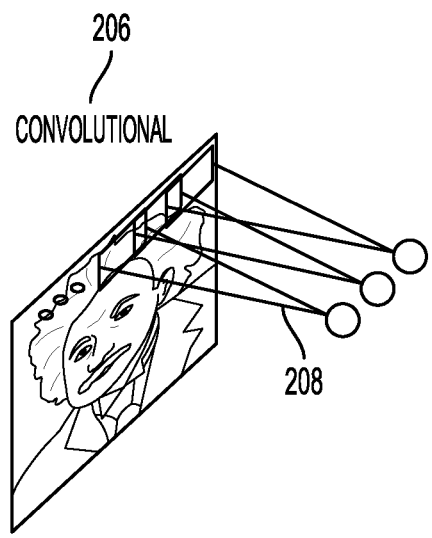

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
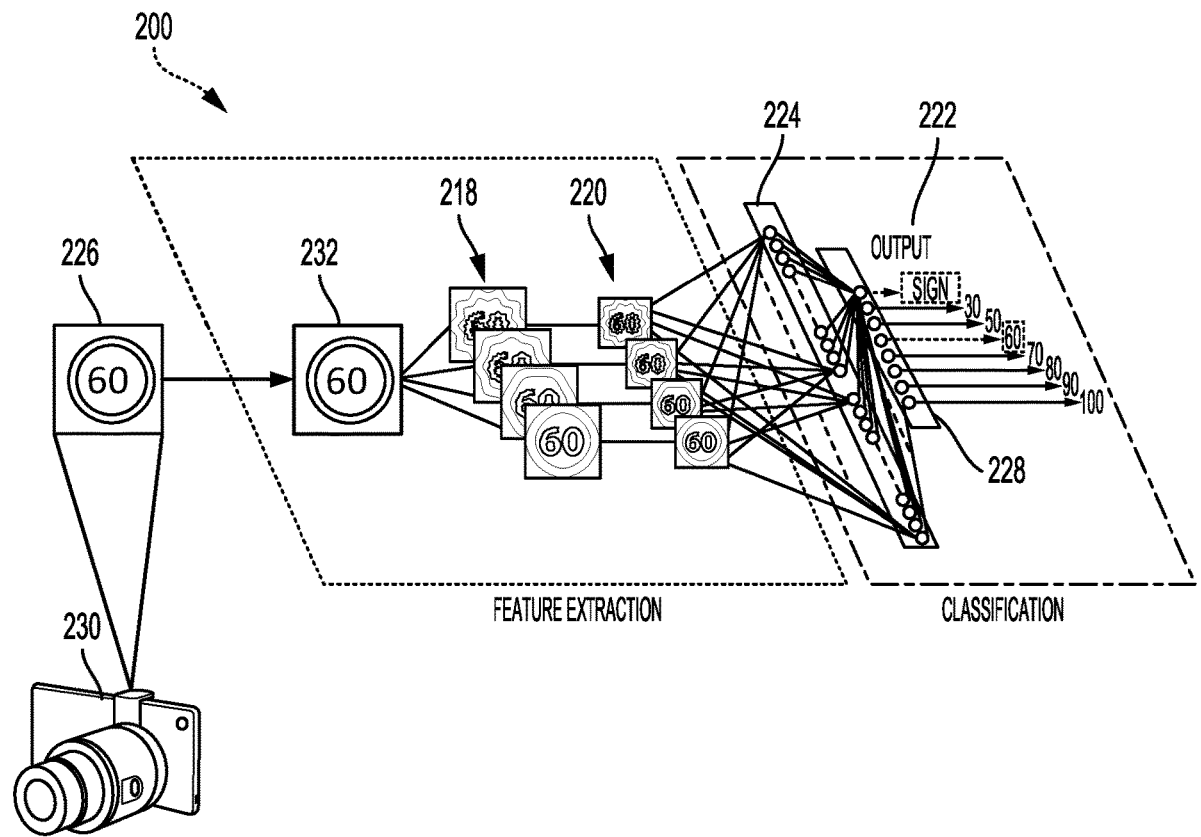
FIG. 2D is a diagram illustrating a neural network in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
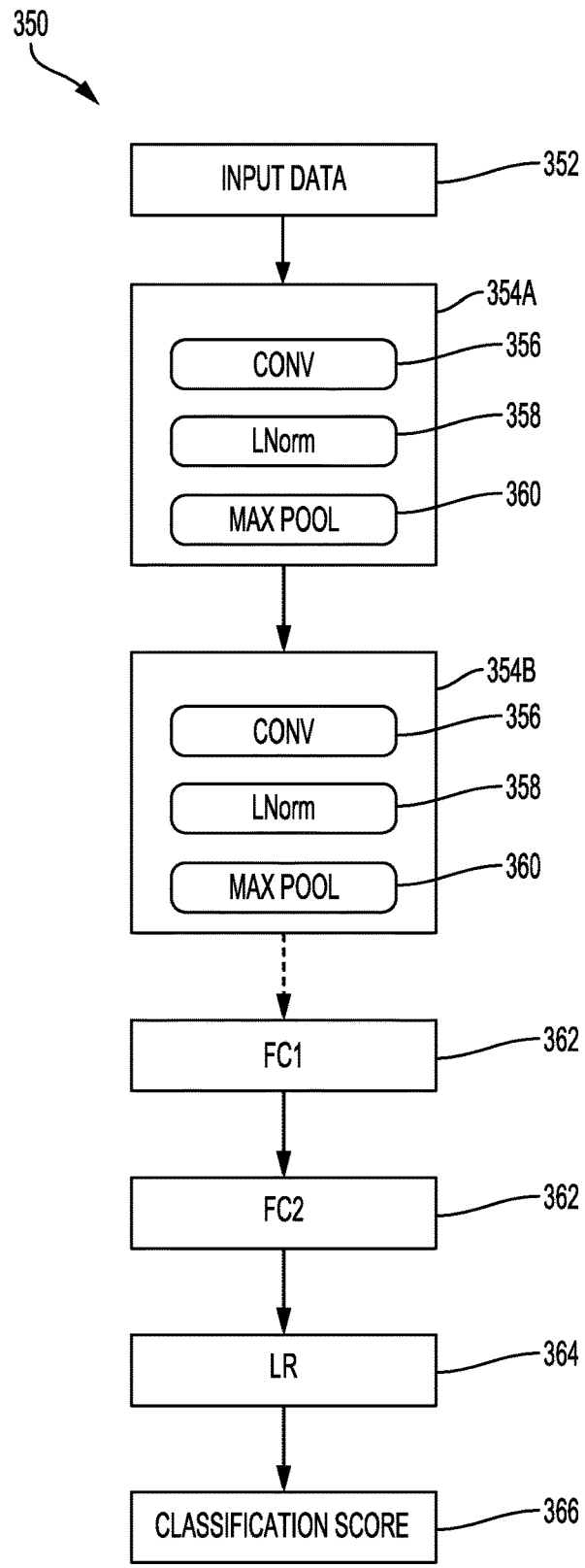
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
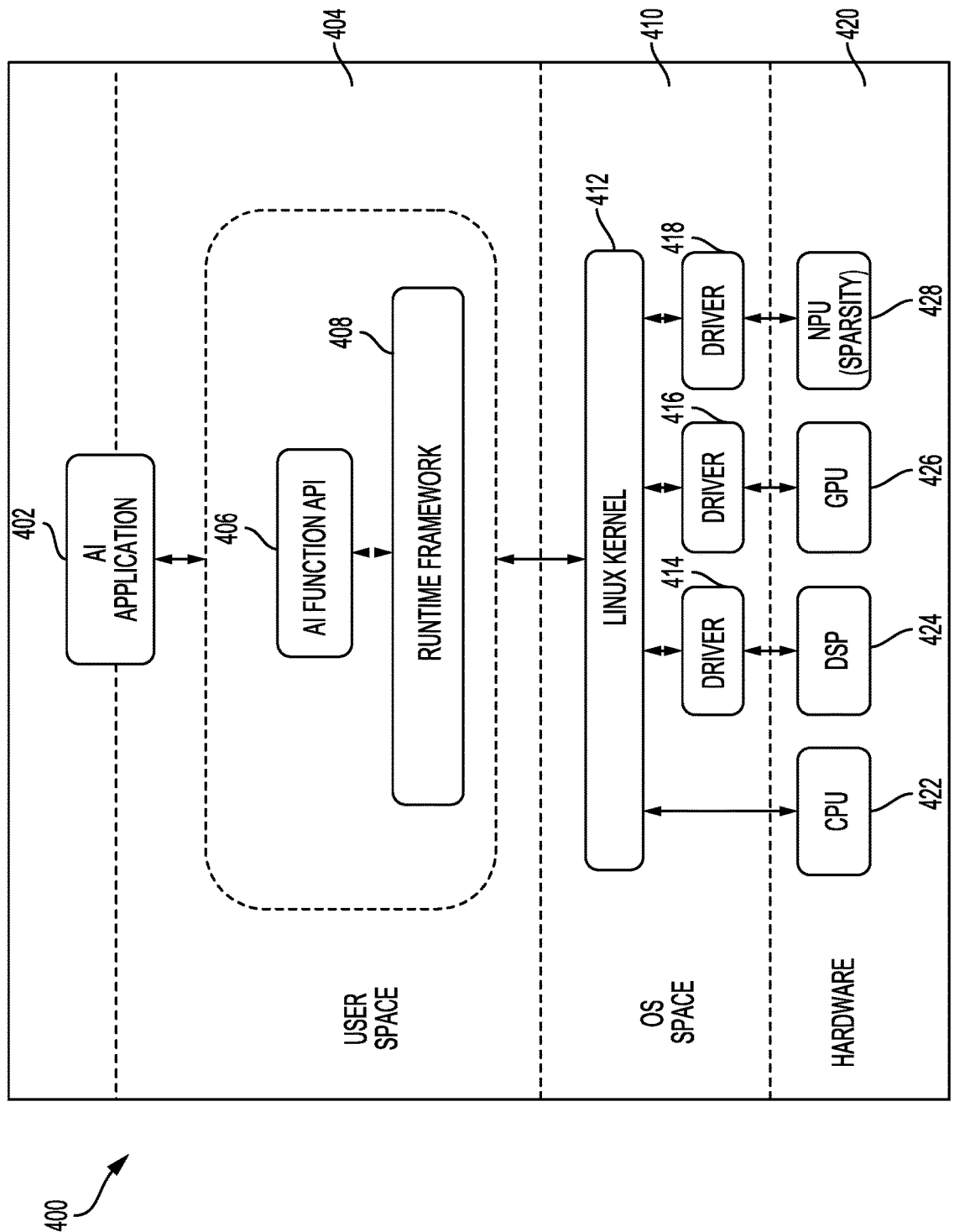
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to exploit activation sparsity in computations during run-time operation of an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may exploit activation sparsity in computations performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Figure 5:
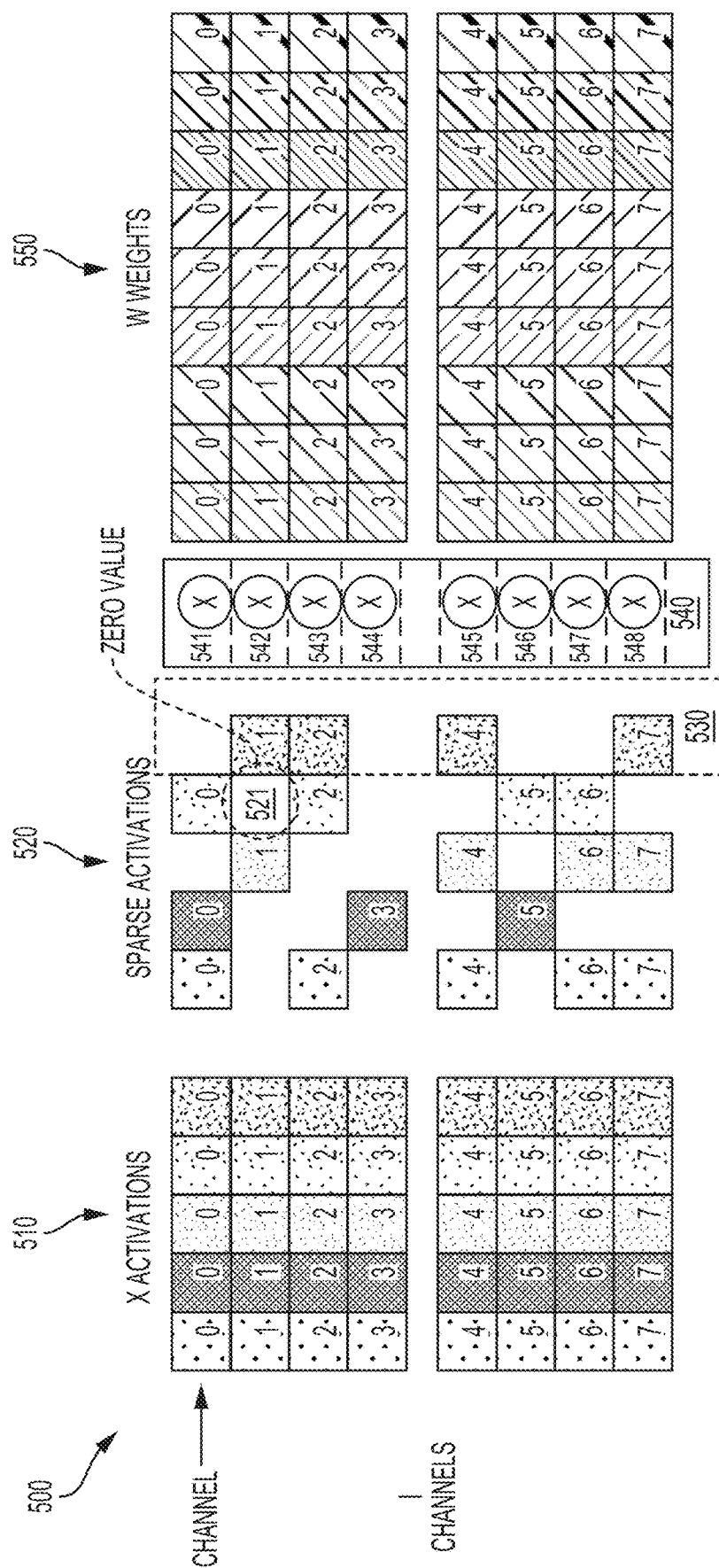
FIG. 5 is a block diagram illustrating vector lanes of multiply-accumulate (MAC) hardware to compute dot products of sparse activations and weights in accordance with conventional practice.

FIG. 5 is a block diagram illustrating vector lanes to compute dot products of activations and weights in a deep neural network (DNN) 500. This example illustrates a part of processing a layer of DNN 500, in which an X*I activation tensor and a W*I weight tensor are retrieved from memory. FIG. 5 shows a simplified example in which X=5, I=8, and W=9 to avoid obscuring details of the present disclosure. Processing the layer of the DNN 500 may include calculating the dot product of every column of an activation tensor 510 with every column of a weight tensor 550 using multiple accumulate (MAC) hardware 540. In this example, a calculation of 360 (=5*8*9) products can be done in 45 (X*W) clock cycles. Notably, the activation tensor 510 has many zero values. Processing of activations having a zero value may be wasteful. Aspects of the present disclosure exploit activation sparsity caused by zero value activations to reduce the total number of multiplications performed. As detailed below, compacting and rearranging the non-zero values of the activation tensor 510 allows for the calculation of the output of the layer of the DNN 500 in fewer clock cycles.

Activations in the DNN 500 may be understood as activation blocks that are represented as 3D activation tensors, including an X-component, a Y-component, and a location component (e.g., a corresponding sample location/pixel location of the activation in an audio/video stream). In this example, the activation tensor 510 may be represented as an I*X array, with elements from A(1,1) to A(I,X). In addition, the weight tensor 550 may be represented as an I*W array, with elements from B(1,1) to B(I,W). In order to avoid overcrowding the figures, however, the elements of the activation tensor 510 and the weight tensor 550 are shown in the figures with a number indicating the channel (e.g., of the I channels) and a shade indicating the column. Computed products of the activation tensor 510 and the weight tensor 550 may be stored in memory for processing at a next layer of the DNN 500.

As shown in FIG. 5, each shade (e.g., source-column) of the activation tensor 510 may correspond to an activation from a different input location. The different input location (e.g., number of the source-column) may correlate to a different element (e.g., number of elements) in a previous layer of the DNN 500. In addition, each channel label (e.g., 0-7) of the activation tensor 510 may include a different activation value. That is, the channel label (e.g., 0-7) of the activation tensor 510 is not indicative of the value of the activation. For example, the I number of channels may correlate to the number of filters in the previous layer of the DNN 500. In addition, values of the weight tensor 550 are read from memory. The number of weights W of the weight tensor 550 may correlate to the number of filters of the present layer, which should correspond to the number of channels in the next layer.

In operation, multiply-accumulate (MAC) hardware 540 computes a dot product of each weight column of the weight tensor 550 with each column of the activation tensor 510, one dot product for each clock cycle. In this example, the MAC hardware 540 processes each multiplier/vector lane (e.g., 541, 542, 543, 544, 545, 546, 547, and 548) with a corresponding MAC unit. Notably, zero activations contribute nothing to the dot product, but consume a multiplier/vector lane (e.g., 541, 542, 543, 544, 545, 546, 547, and 548) as well as a clock cycle. This wastes valuable resources available to the DNN 500.

In particular, application of a rectified linear unit (ReLU) nonlinear activation function in a previous layer of the DNN 500 to compute the activation tensor 510 results in sparse activations 520 when the activation tensor 510 is viewed with zero value activations removed. Notably, a significant number of activation values are zero, in which zero activation values are shown as a blank space (e.g., zero activation 521). The zero activations are produced because ReLU nonlinear activation functions are generally configured to clamp activation values less than zero to an activation value of zero in the previous layer. The non-zero activation values in the sparse activations 520 are shown including their corresponding channel and their shade to indicate their original location.

As further illustrated in the sparse activations 520, a column 530 is shown including zero activations in channels 0, 3, 5, and 6 (corresponding to multiplier/vector lanes 541, 544, 546, and 547). As noted above, computing a dot product by the MAC hardware 540 on these zero activations during the clock cycle corresponding to the column 530 wastes resources of the MAC hardware 540. In the column 530, valuable work is not performed in the blank rows because the dot product computed by the MAC unit is zero when the value of the activation is zero. That is, there is no useful work to be performed when multiplying by zero. Thus, the multiplier/vector lanes (e.g., 541, 544, 546, and 547) of the MAC hardware 540 are effectively empty for zero activation values.

Figure 6:
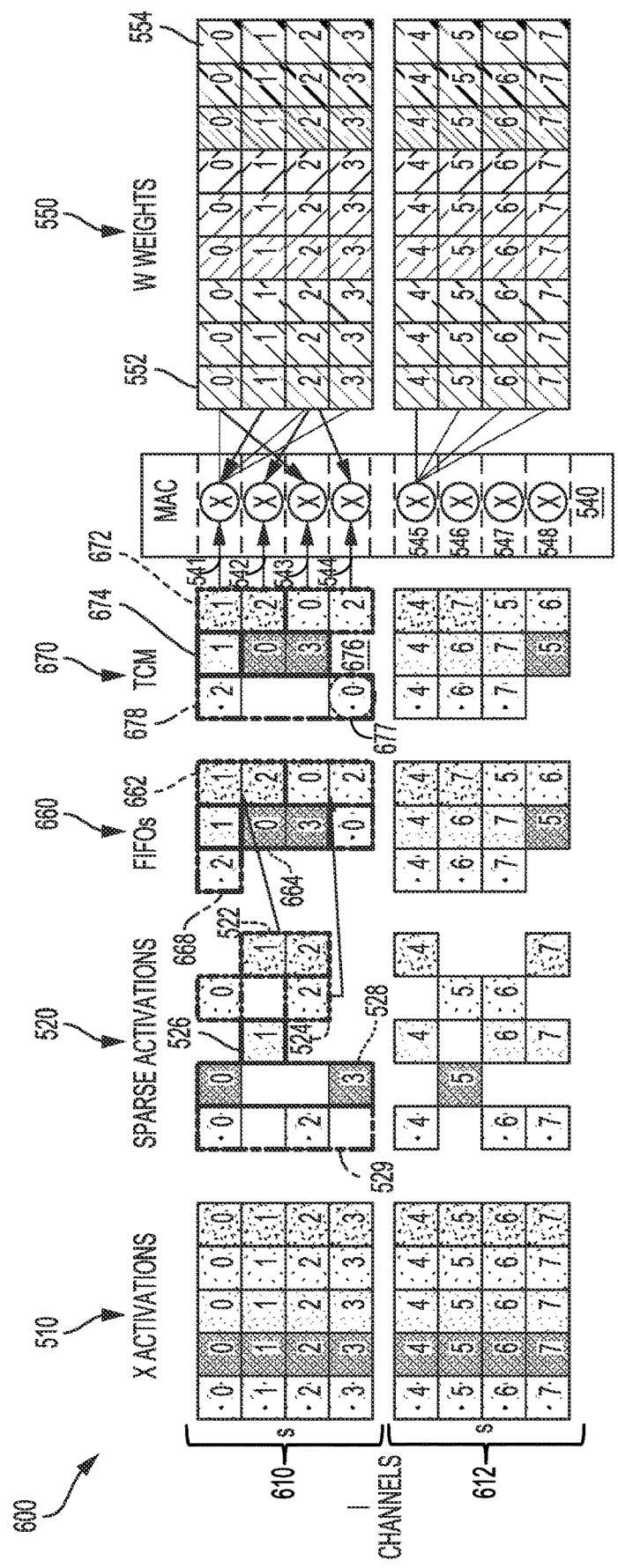
FIG. 6 is a block diagram illustrating vector lanes of multiply-accumulate (MAC) hardware to compute dot products of sparse activations and weights in accordance with aspects of the present disclosure.

As should be recognized by the sparse activations 520, a given row of the activation tensor 510 may be highly correlated. For example, some channels of the activation tensor 510 corresponding to multiplier/vector lanes of the MAC hardware 540 have a significant amount of computations to perform. By contrast, other channels of the activation tensor 510 correspond to vector lanes (e.g., 541, 542, 543, 544, 545, 546, 547, and 548) of the MAC hardware 540 having a minimal amount of computations to perform due to increased numbers of zero activations. In aspects of the present disclosure, non-zero activations are redistributed in time (and clock cycle) to empty multiplier/vector lanes of the MAC hardware 540, for example, as shown in FIG. 6. As described herein, the redistribution of non-zero activations in time and clock cycle to empty multiplier/vector lanes may be referred to as lane sloshing. An empty multiplier/vector lane occurs when a number of the multiplier/vector lanes processing a non-zero activation during a clock cycle is less than a vector width (e.g., =eight (8)) of the MAC hardware 540.

FIG. 6 is a block diagram further illustrating the multiplier/vector lanes of multiply-accumulate (MAC) hardware of FIG. 5 to compute dot products of sparse activations and weights in a deep neural network (DNN) 600, in accordance with aspects of the present disclosure. In this aspect of the present disclosure, non-zero activations are packed into the multiplier/vector lanes of the MAC hardware 540 to avoid wasting processing resources during a clock cycle due to processing a zero-activation value.

In this example, the activation tensor 510 is shown as a first multilane segment 610 (e.g., a first input stream) of s-rows (e.g., 0-3) of the X activations that may use any corresponding one of the multiplier/vector lanes (e.g., 541 to 544) of the MAC hardware 540. In addition, a second multilane segment 612 (e.g., a second input stream) of s-rows of the X activations that may be redistributed (e.g., activation sloshing) to any corresponding one of the multiplier/vector lanes (e.g., 545 to 548). That is, activation sloshing across the multiplier/vector lanes (e.g., 541 to 544 or 545 to 548) of MAC hardware 540 increases processing of non-zero activations. In this example, activations from the first multilane segment 610 are packed (e.g., compacted) in first-in-first-out (FIFO) buffers 660 (or memory buffer) in a maximally dense form using intra-segment lane sloshing. That is, the FIFO buffers 660 include only non-zero activations of the first multilane segment 610 in a first compressed-activation column 662 and a second compressed-activation column 664.

According to the configuration shown in FIG. 6, the sparse activations 520 of the first multilane segment 610 are shown in five columns. A first column 522 includes non-zero activations from channels one (1) and two (2). A second column 524 includes activations from channels 0 and 2. A third column 526 includes a single activation from channel 1. A fourth column 528 includes activations from channels 0 and 3. In addition, a fifth column 529 includes activations from channels 0 and 2. It should be recognized that the various columns (e.g., 522-529) include non-zero activations having the same source-column (shown here as grey scale shading). The various shades of grey scale are shown to represent the different columns for the purpose of simplifying explanation of the present disclosure. Although described as shades of grey, this is provided for illustration purposes only, such that the shade generally indicates a corresponding input location.

In this configuration, each of the FIFO buffers 660 includes an S:1 multiplexer (not shown) at an input of each of the FIFO buffers 660. The S:1 multiplexers enable packing of the sparse activations 520 in the FIFO buffers 660. In this example, the activations from the second column 524 are packed with the activations from the first column 522 of the sparse activations 520 into the first column 662 of the FIFO buffers 660. Similarly, activations from the third column 526, the fourth column 528, and the fifth column 529 of the sparse activations 520 are packed into the second column 664 of the FIFO buffers 660. An activation from channel 2 of the fifth column 529 of the sparse activations 520 is stored in the third column 668 of the FIFO buffers 660, which is not full.

A painting algorithm may pack the activations in the FIFO buffers 660. For example, the painting algorithm may be used to populate the FIFO buffer 660 from the first multilane segment 610 of the activation tensor 510. In this example, the painting function operates by traversing down and across the sparse activations 520 and populating the FIFO buffer 660 with the non-zero activation values. For example, arrows are shown to illustrate packing of the first column 522 and the second column 524 of the sparse activations 520 in the first column of the FIFO buffers 660. According to aspects of the present disclosure, the FIFO buffers may include multiplexers (not shown) that may be used to implement the painting function and the compacting function of non-zero activations of the activation tensor 510.

According to aspects of the present disclosure, hardware complexity is controlled by limiting the compressed activation columns (e.g., 662, 664, and 668) of the FIFO buffers 660. In this configuration, the compressed activation columns of the FIFO buffer are limited to K (e.g., two) source-columns. Accordingly, activation values from the source-columns (e.g., 522, 524, 526, 528, and 529) of the sparse activations 520 may be moved to other compressed activation columns of the FIFO buffer 660 to meet, but not exceed, the source-column constraint when stored in memory for processing by the MAC hardware 540, as described in further detail below.

Once loaded into the compressed activation columns of the FIFO buffers 660, activations from the compressed activation columns of the FIFO buffers 660 may be popped from the FIFO buffers 660 and written to tightly coupled memory (TCM 670) with their metadata for processing on a corresponding one of the multiplier/vector lanes (e.g., 541, 542, 543, or 544) by the MAC hardware 540. In this example, however, writing of the activations to the vector lanes (e.g., 541, 542, 543, and 544) corresponding to columns (e.g., 672, 674, 678) of the TCM 670 does not match the arrangement of the activations in the compressed activation columns (e.g., 662, 664, 668) of the FIFO buffers 660. The mismatch is caused by enforcement of a constraint on the number of different source-column (e.g., grey scale activations) for each compressed activation column of the FIFO buffers 660. In other words, only activations from two source-columns (e.g., two grey scales) of the first multilane segment 610 of the activation tensor 510 are allowed in a single column in the TCM 670. In this example, the source-column constraint is K-source-column activations (e.g., two grey scale activations) for each column, which may be referred to as a maximum product number.

In this aspect of the present disclosure, the second column 664 of the FIFO buffers 660 does not match the second column 674 of the TCM 670 because the activation of channel 0 is written to the third column 678 of the TCM 670. That is, including the activation of channel 0 in the second column 674 of the TCM 670 would violate the source-column constraint by having three different grey scale activations in the second column 674 of compressed activations of the TCM 670. As described herein the activation columns of the TCM 670 may be referred to as compressed activation columns, and the contents of the TCM 670 may be referred to as a compressed activation tensor. As a result, a zero activation value 676 is loaded into the TCM 670 and loaded onto the multiplier/vector lane 544. In addition, the non-zero activation 677 is loaded into the TCM 670 and mapped to the multiplier/vector lane 544 for processing during a subsequent clock cycle. In aspects of the present disclosure, at least one processor (not shown) coupled to the MAC hardware 540, is configured to redistribute a non-zero activation of the activation tensor 510 to an available location.

In operation, metadata regarding the grey scale (original source-column) and a number (original row/channel) of the activations is stored in the TCM 670 to direct, for example, multiplexers to provide the corresponding weight column of the weight tensor 550. The metadata is written to the TCM 670 so that each multiplier of the MAC hardware 540 matches a weight row of the weight tensor 550 to the channel lane of the respective activation. The MAC hardware 540 may include an arithmetic logic unit (ALU) to compute a dot product of a non-zero activation multiplied by one weight of the weight tensor 550 corresponding to the channel. In this example, the number associated with the activation tensor 510 may indicate an input channel. In addition, shades of the activation tensor 510 indicate a sample from the input (e.g., a pixel with many input channel values). A shade of the weight tensor 550 indicates output channel (or filter). For example, an activation from channel 1 in the first column 672 of the TCM 670 is multiplied by a weight (e.g., corresponding to channel one (1)) in column 552 of the weight tensor 550, in which a column 554 is also shown. This is performed for each of the activations in a respective column of the TCM 670 for each clock cycle.

Figure 7:
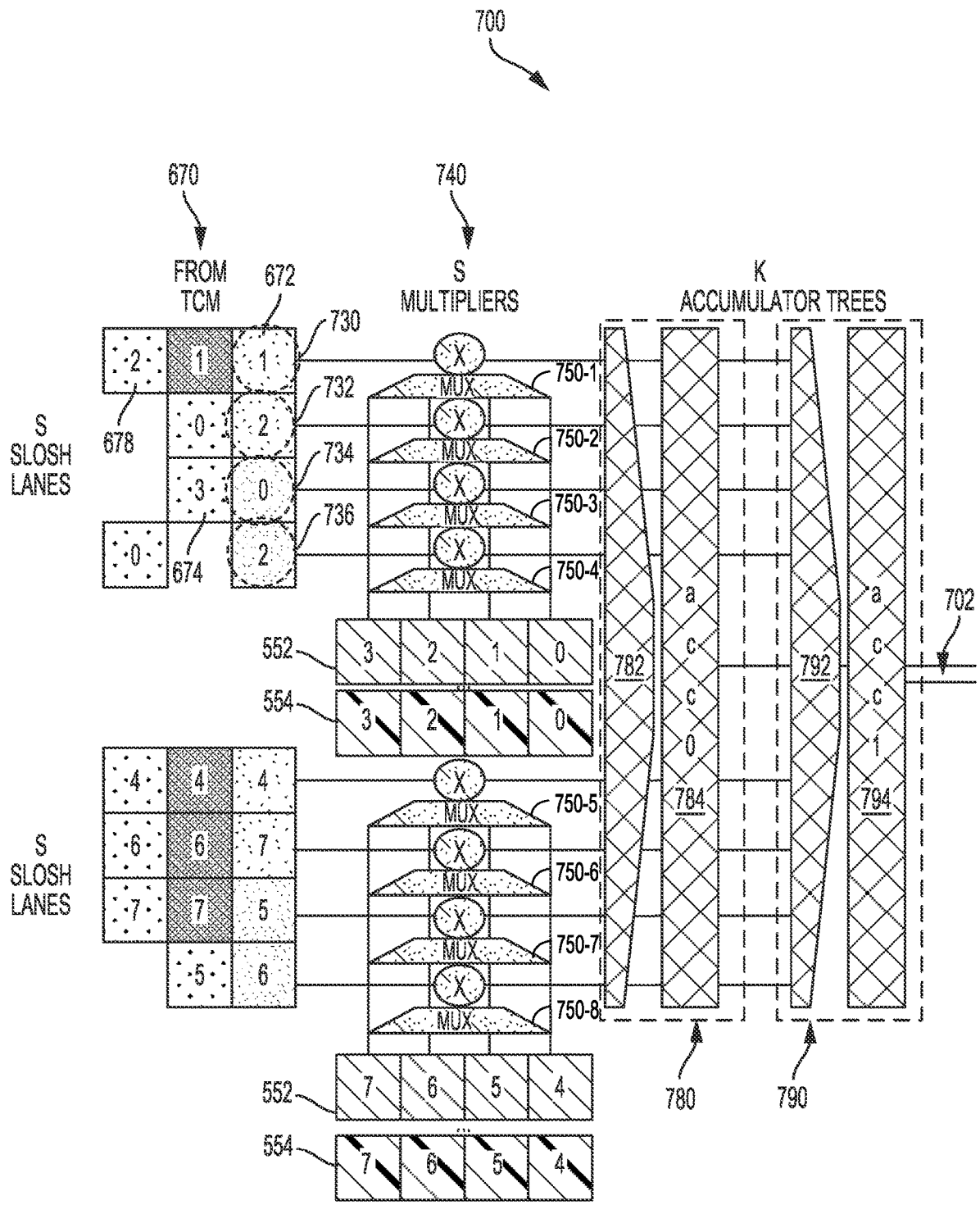
FIG. 7 is a block diagram further illustrating the multiply-accumulate (MAC) hardware of FIG. 6 in accordance with aspects of the present disclosure.

FIG. 7 is a block diagram illustrating the multiply-accumulate (MAC) hardware 700 to support the configuration of the DNN 600 of FIG. 6 in accordance with aspects of the present disclosure. In this configuration, S multipliers 740 are shown along with K accumulator trees. A first accumulator tree 780 include a first adder 782 and a first accumulator 784. In addition, a second accumulator tree includes a second adder 786 and a second accumulator 788. Although this configuration of the MAC hardware is shown for two source-columns (e.g., K=2) of activations and eight multipliers (e.g., S=8), it should be recognized that other configurations are possible. In the configuration shown, hardware costs are reduced and adjustable relative to the K value of the K accumulator trees. In this configuration, each clock cycle may compute up to K distinct dot product results, in which the K accumulator trees may be cleared after each clock cycle and assigned to new multiplier/vectors lanes according to the source-column constraint.

In this example, the MAC hardware 700 is configured to process activations of the first multilane segment 610 and the second multilane segment 612 rearranged in the TCM memory 670 to reduce processing of zero value activations, as described in FIG. 6. As shown in FIG. 7, the TCM memory 670, including rearranged/sloshed activations is subject to a number of different source-columns (=2). This constraint is shown using different shading of the activations in the TCM 670. Because this example is limited to a source-column constraint of two different numbers of source-columns, implementation of accumulators for the MAC hardware 700 is simplified. In particular, this configuration may be implemented with two adders (e.g., 782 and 792) and two corresponding accumulators (e.g., 784 and 794), as described in further detail below.

In this example, the column 552 and the column 554 from the weight tensor 550 in FIG. 6 are rotated horizontally to represent the weight tensor 550, without obscuring details of the present disclosure. During each clock cycle, the activation of a column of the TCM 670 are multiplied by a corresponding weight using multiplexers 750 (750-1, 750-2, 750-3, 750-4, 750-5, 750-6, 750-7, and 750-8). For example, for a first activation 730 in the first column 672 of the TCM 670, the multiplexer 750-1 is configured to route each weight corresponding to channel 1 to match the channel of the first activation 730. Similarly, for a second activation 732, the multiplexer 750-2 is configured to route each weight corresponding to channel 2 to match the channel of the second activation 732. In addition, the multiplexer 750-3 is configured to route each weight corresponding to channel 0 to match the channel of a third activation 734 in the first column 672. The multiplexer 750-4 is also configured to route each weight corresponding to channel 2 to match the channel of the fourth activation 736 in the first column.

Depending on a source-column of the activation (shown with a fill pattern), the product is sent to an appropriate accumulator tree of the K accumulators. As described herein an accumulator tree collective refers to the combination of an adder and an accumulator. For example, a first accumulator tree may refer to the combination of the first adder 782 and the first accumulator 784. In addition, a second accumulator tree may refer to the combination of the second adder 786, and a second accumulator 788.

In this configuration, stored metadata is used to determine the accumulator tree to which a dot product is sent. For example, the first activation 730 and the second activation 732 from the first column 672 of the TCM 670 having the same source-column and are, therefore, routed to the first adder 782 and the first accumulator 784 (acc0) of the first accumulator tree 780. By contrast, the third activation 734 and the fourth activation 736 from the first column 672 of the TCM 670 are routed to the second adder 792 and the second accumulator 794 (acc1) of the second accumulator tree 790. The adders (e.g., 782 and 792) add the products and send them to the respective accumulator (e.g., 784 and 794). After a processing of a source-column is finished, the first accumulator tree 780 are popped and a source-column of activations is sent to the first accumulator tree 780 and the second accumulator tree 790 for the next column of the TCM 670. The processing of non-zero activation input tensors and weight tensors is performed by the first accumulator tree 780 and the second accumulator tree 790 to produce an output tensor 702.

Figure 8:
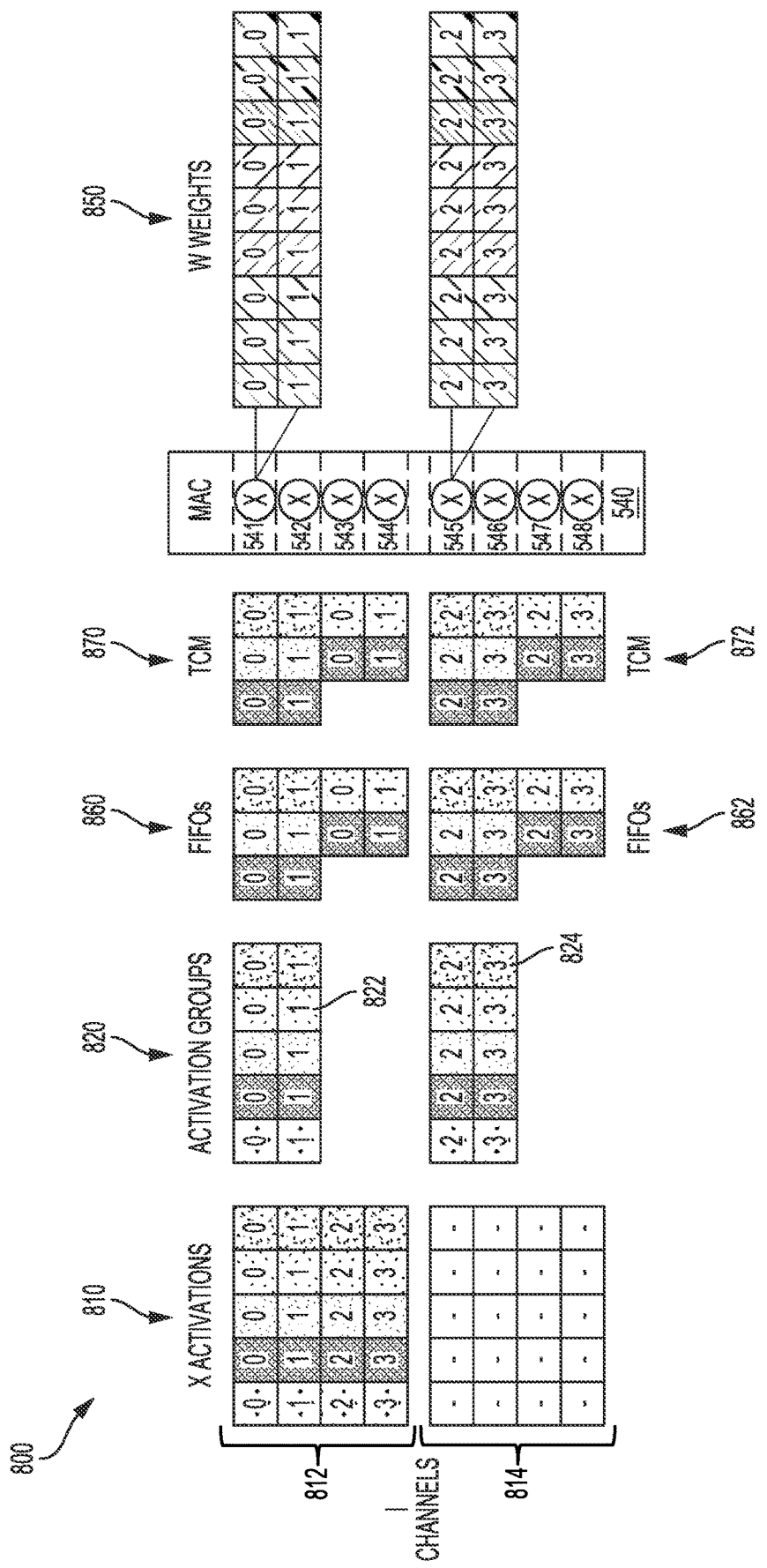
FIG. 8 is a block diagram 800 illustrating vector lanes of multiply-accumulate (MAC) hardware when an empty channel is detected, in accordance with aspects of the present disclosure.

FIG. 8 is a block diagram 800 illustrating the multiplier/vector lanes (e.g., 541, . . . , 548) of multiply-accumulate (MAC) hardware when an empty stream (e.g., a second multilane 814) of an activation tensor 810 is detected, in accordance with aspects of the present disclosure. In this example, a first multilane segment 812 and a second multilane segment 814 are shown as a first input stream and a second input stream of the activation tensor 810. In contrast to the configurations shown in FIGS. 5-7, channels (e.g., 4-7) of the second multilane segment 814 are empty. This scenario occurs when the number of channels of the activation tensor 810 is less than the vector width (e.g., eight) of the MAC hardware 540. That is, although a vector width of the MAC hardware 540 is eight in this example, the activation tensor 810 is limited to the four channels of the first multilane segment 812, as the second multilane segment 814 is empty. Nevertheless, instead of allowing half of the MAC hardware 540 to remain idle, artificial sparsity is introduced to spread the four channels of the first multilane segment 812 across the MAC hardware 540 to maximize resource utilization.

Once the second multilane segment 814 is detected as empty, control logic (e.g., the SOC 100) may be configured to spread the first multilane segment 812 of the activation tensor 810 across the multiplier/vector lanes of the MAC hardware 540. This process includes grouping non-zero activations from different channel lanes into activation groups 820, including a first activation group 822 and a second activation group 824. As shown in FIG. 8, the number of activation groups (e.g., 822 and 824) of activations is less than a channel depth of the first multilane segment 812 of the activation tensor 810. The activation groups (e.g., 822 and 824) include a number of non-zero channels and zero channels. In addition, a group depth multiplied by the number of groups equals the processing vector width of the MAC hardware 540. In this configuration, the non-zero activations from the first activation group 822 are packed into the FIFO buffers 860. Similarly, the non-zero activations from the second activation group 824 are packed into FIFO buffers 862. Subsequently, the non-zero activations are popped from the FIFO buffers 860 and the FIFO buffers 862 and stored in the TCM memory 870 and the TCM memory 872 for processing on the vector lanes of the MAC hardware 540 to compute dot products of the activations and the weights of a weight tensor 850.

As shown in FIG. 8, the packing process into the FIFO buffers (e.g., 860 and 862) and the TCM memory (e.g., 870 and 872) is similar to the methodologies shown in FIG. 6. While some resources of the MAC hardware 540 may go unused during certain clock cycles, using artificial sparsity and packing of the FIFO buffers (e.g., 860 and 862) and the TCM memory (e.g., 870 and 872) according to the source-column activation constraint reduces an amount of wasted resources when encountering empty activation channels. A process for exploiting activation sparsity is shown in FIG. 9.

Figure 9:
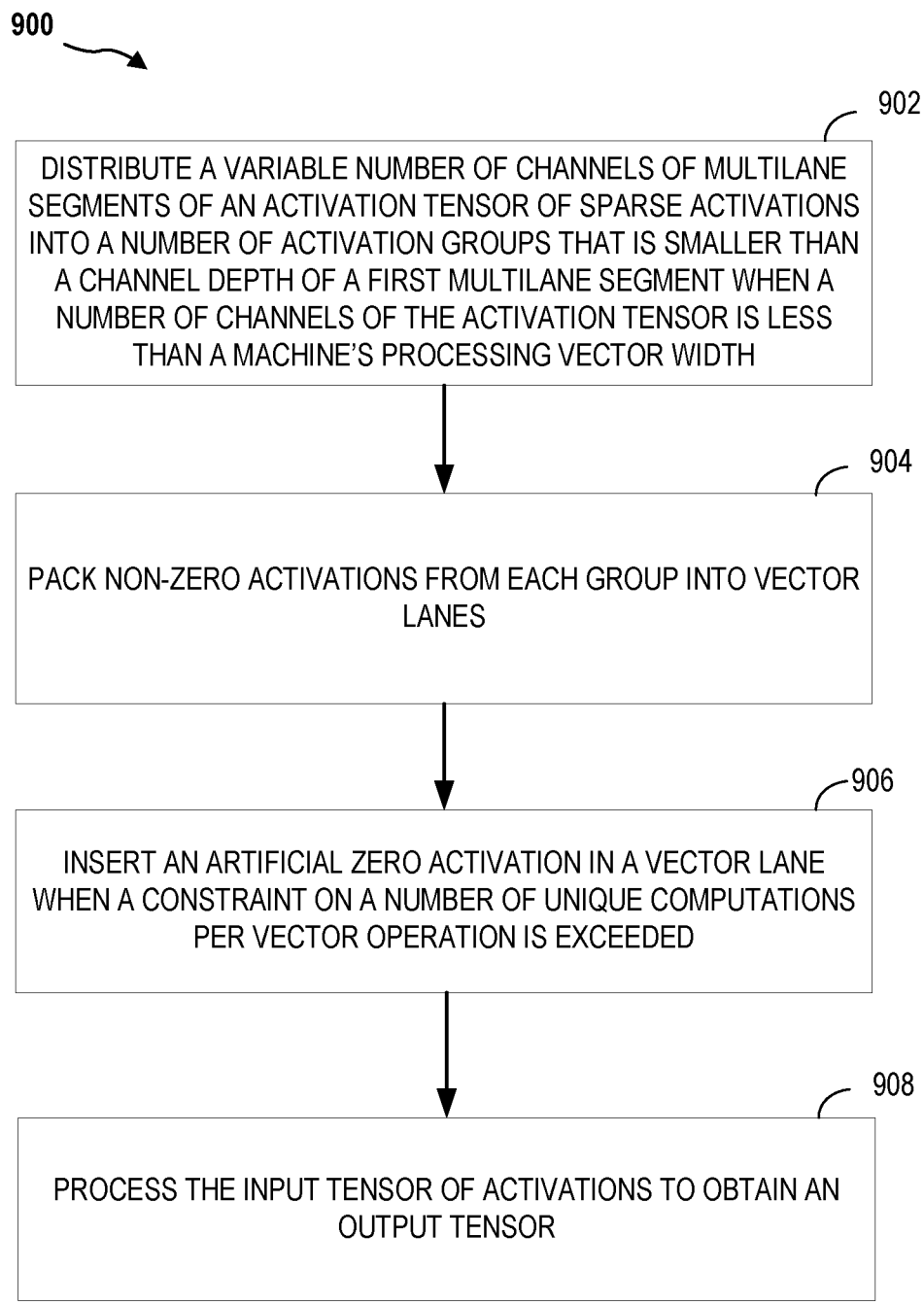
FIG. 9 illustrates a method for exploiting activation sparsity to improve efficiency of multiply-accumulate (MAC) hardware in accordance with aspects of the present disclosure.

FIG. 9 illustrates a method of exploiting activation sparsity to improve efficiency of multiply-accumulate (MAC) hardware in accordance with aspects of the present disclosure. A method 900 begins at block 902, in which a variable number of channels of multilane segments of an activation tensor of sparse activations are redistributed into a number of activation groups that are smaller than a channel depth of a first multilane segment when a number of channels of the activation tensor is less than a machine's processing vector width. For example, as shown in FIG. 8, the first multilane segment 812 (e.g., first input stream) and the second multilane segment 814 (second input stream) of the activation tensor 810 are shown. The first multilane segment 812 has a channel depth of four lanes of activations. Because the number of channels (=4) of the activation tensor 810 is less than the machine's processing vector width (=8), the first multilane segment 812 includes activations, whereas the second multilane segment 814 is empty. In this example, the first multilane segment 812 of activation tensor 810 is distributed into activation groups, including a first activation group 822 and a second activation group 824.

Referring again to FIG. 9, in block 904, non-zero activations from each group are packed into vector lanes. For example, as shown in FIG. 8, the non-zero activations from the first activation group 822 are packed into the FIFO buffers 860. Similarly, the non-zero activations from the second activation group 824 are packed into FIFO buffers 862. Subsequently, the non-zero activations are popped from the FIFO buffers 860 and the FIFO buffers 862 and stored in the TCM memory 870 and the TCM memory 872 for processing on the vector lanes of the MAC hardware 540.

In block 904, an artificial zero activation is inserted into a vector lane when a constraint on a number of unique computations for each vector operation is exceeded. For example, as shown in FIG. 6, a zero activation value 676 is inserted in the second column 674 of the vector lane corresponding to channel 3. In addition, the non-zero activation (channel 0) is loaded on the vector lane corresponding to channel 3 at the third column 678 of the vector lanes, which corresponds to a next clock cycle. The constraint may be violated when a group of the non-zero activation input values packed onto vector lanes of the MAC hardware 540 includes a number of different source locations (e.g., channel number) greater than a maximum product number of the MAC hardware 540.

In block 906, the input tensor of activations is processed to obtain an output tensor. For example, as shown in FIG. 7, the processing of the input tensor of activations (e.g., activation tensor 510) and weight tensors (e.g., weight tensor 550) is performed by the MAC hardware to produce an output tensor 702. This process may include determining original channel lanes (e.g., channels) of the non-zero activations of the input tensor of activations to identify the corresponding weight tensor(s). The process also includes computing a dot product of the non-zero activations of the activation tensor and a weight tensor corresponding to the original channel lane of the non-zero activations to obtain an output tensor at block 908.

In one configuration, a machine learning model is configured for receiving an activation from an intermediate layer of the DNN. The model is also configured for spreading sparse activations according to idle vector lanes. The model is further configured for tracking the spreading of the activations to enable dot product computation of the activations with corresponding weight tensors and introducing artificial sparsity when empty activation channels are detected.

In some aspects, the method 900 may be performed by the SOC 100 (FIG. 1). That is, each of the elements of method 900 may, for example, but without limitation, be performed by the SOC 100 or one or more processors (e.g., CPU 102 and/or NPU 108) and/or other components included therein.

Aspects of the disclosure spread work across vector lanes of multiply-accumulate (MAC) hardware to improve multiplier utilization. Work is spread across the vector lanes of the MAC hardware by compressing sparse activations onto vector lanes to minimize a number of empty (e.g., including a zero activation) vector lanes for each clock cycle. In addition, on-chip memory bandwidth and power are reduced with compact zeros removed from of activation data before writing to on-chip memory, thereby improving operational efficiency of a deep neural network (DNN). Aspects of the present disclosure also use both a slosh constraint (maximum sloshing across S rows), and an accumulator constraint (maximum different source-column number) to trade off area/power cost versus efficiency. When the number of input channels is less than the vector width of the machine, resulting in empty activation channels, artificial sparsity is introduced to spread the activations of the non-empty channel across the vector lanes of MAC hardware. Aspects of the disclosure support efficient execution of layers (e.g., pixel values/audio samples) whose shape does not map perfectly to a vector unit width. Aspects of the disclosure compress sparse activations to accelerate processing. That is, a number of elements in a vector are remapped to avoid idle time slots.

The model includes means for distributing, means for packing non-zero activations, means for inserting, and means for processing. The model also includes means for computing, means for detecting, means for determining original channel lanes of an input tensor of activations, means for painting, means for redistributing, and means for multiplexing weights of the weight tensor. In one aspect, the distributing means, packing means, inserting means, means for multiplexing, means for painting, means for redistribution, and/or processing means may be the multiplexers 750, the CPU 102, program memory associated with the CPU 102, memory block 118, the NPU 108 program memory associated with the NPU 108, the CPU 422, and/or the NPU 428 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A processor-implemented method, comprising:
   retrieving an activation tensor and a weight tensor where the activation tensor is a sparse activation tensor;
   generating a compressed activation tensor comprising non-zero activations of the activation tensor, where the compressed activation tensor has fewer columns than the activation tensor; and
   processing the compressed activation tensor and the weight tensor using any available multiply-accumulate (MAC) hardware to generate an output tensor, wherein generating a compressed activation tensor comprises packing the non-zero activations using intra-segment lane sloshing.

2. The processor-implemented method of claim 1, in which generating the compressed activation tensor comprises:
   painting the non-zero activations of the activation tensor into a memory buffer; and
   redistributing the non-zero activations within the memory buffer to a location in the memory buffer mapped to an empty vector lane of the MAC hardware during a clock cycle.

3. The processor-implemented method of claim 2, further comprising inserting an artificial zero activation in a location of the memory buffer mapped to a vector lane when a constraint on a number of unique computations per vector operation is exceeded.

4. The processor-implemented method of claim 1, further comprising detecting an empty vector lane when a number of vector lanes having one of the non-zero activations during a clock cycle is less than a processing vector width of the MAC hardware.

5. The processor-implemented method of claim 1, in which generating the compressed activation tensor comprises packing non-zero activations onto vector lanes of the MAC hardware according to a constraint on a number of unique computations per vector operation.

6. The processor-implemented method of claim 1, further comprising:
   determining original channel lanes of the non-zero activations of the compressed activation tensor; and
   computing a dot product of the non-zero activations of the compressed activation tensor and weights of the weight tensor corresponding to the original channel lanes of the non-zero activations of the compressed activation tensor;
   wherein metadata indicating the original channel lanes of the non-zero activations of the compressed activation tensor is stored in on-chip memory.

7. The processor-implemented method of claim 1, in which processing the compressed activation tensor comprises distributing dot products of a non-zero activation and a weight from the weight tensor to an accumulator tree of the MAC hardware during a clock cycle, in which a channel number associated with the weight is the channel number of the non-zero activation.

8. The processor-implemented method of claim 1, further comprising:
   distributing a variable number of channels of multilane segments of the activation tensor into a number of activation groups that is smaller than a channel depth of a first multilane segments when a number of channels of the activation tensor is less than a machine's processing vector width;
   packing non-zero activations from each of the activation groups onto vector lanes of the MAC hardware; and
   inserting an artificial zero activation in at least one of the vector lanes when a constraint on a number of unique computations for each vector operation is exceeded.

9. An apparatus comprising:
   a memory; and
   a processor configured to:
      retrieve an activation tensor and a weight tensor where the activation tensor is a sparse activation tensor;
      generate a compressed activation tensor comprising non-zero activations of the activation tensor, where the compressed activation tensor has fewer columns than the activation tensor; and
      process the compressed activation tensor and the weight tensor using any available multiply-accumulate (MAC) hardware to generate an output tensor, wherein generating a compressed activation tensor comprises packing the non-zero activations using intra-segment lane sloshing.

10. The apparatus of claim 9, further comprising first-in-first-out (FIFO) buffers configured to store packed ones of the non-zero activations, wherein the memory is on-chip memory configured to store metadata regarding the non-zero activations.

11. The apparatus of claim 9, further comprising a memory buffer and multiplexers configured:
    to paint the non-zero activations of the activation tensor into the memory buffer; and
    to redistribute the non-zero activations within the memory buffer to a location in the memory buffer mapped to an empty vector lane of the MAC hardware during an upcoming clock cycle.

12. The apparatus of claim 11, wherein the processor is further configured to pack non-zero activations onto vector lanes of the MAC hardware according to a constraint on a number of unique computations per vector operation in order to generate the compressed activation tensor.

13. The apparatus of claim 12, wherein the processor is further configured to insert an artificial zero activation in a location of the memory buffer mapped to a vector lane when the constraint is exceeded.

14. The apparatus of claim 9, wherein the processor is further configured to:
    distribute a variable number of channels of multilane segments of the activation tensor into a number of activation groups that is smaller than a channel depth of a first multilane segment when a number of channels of the activation tensor is less than the apparatus's processing vector width;
    pack the non-zero activations from each of the activation groups into vector lanes; and
    insert an artificial zero activation in at least one of the vector lanes when a constraint on a number of unique computations for vector operation is exceeded.

15. The apparatus of claim 9, wherein the processor is further configured to detect an empty vector lane when a number of the vector lanes having one of the non-zero activations during a clock cycle is less than a processing vector width of the MAC hardware.

16. The apparatus of claim 9, wherein the processor is further configured to distribute dot products of a non-zero activation and weights from the weight tensor to an accumulator tree of the MAC hardware during a clock cycle, in which a channel number of the weights is the channel number of the non-zero activation.

17. The apparatus of claim 9, wherein the apparatus is one of a computational device, a camera, an Internet of Things (IOT) device, an autonomous vehicle, and a robot.

* * * * *